Feb. 25, 1964     R. J. WILLIAMS     3,122,444
PROCESS OF TREATING CARPET CUSHIONS
Filed Dec. 27, 1960
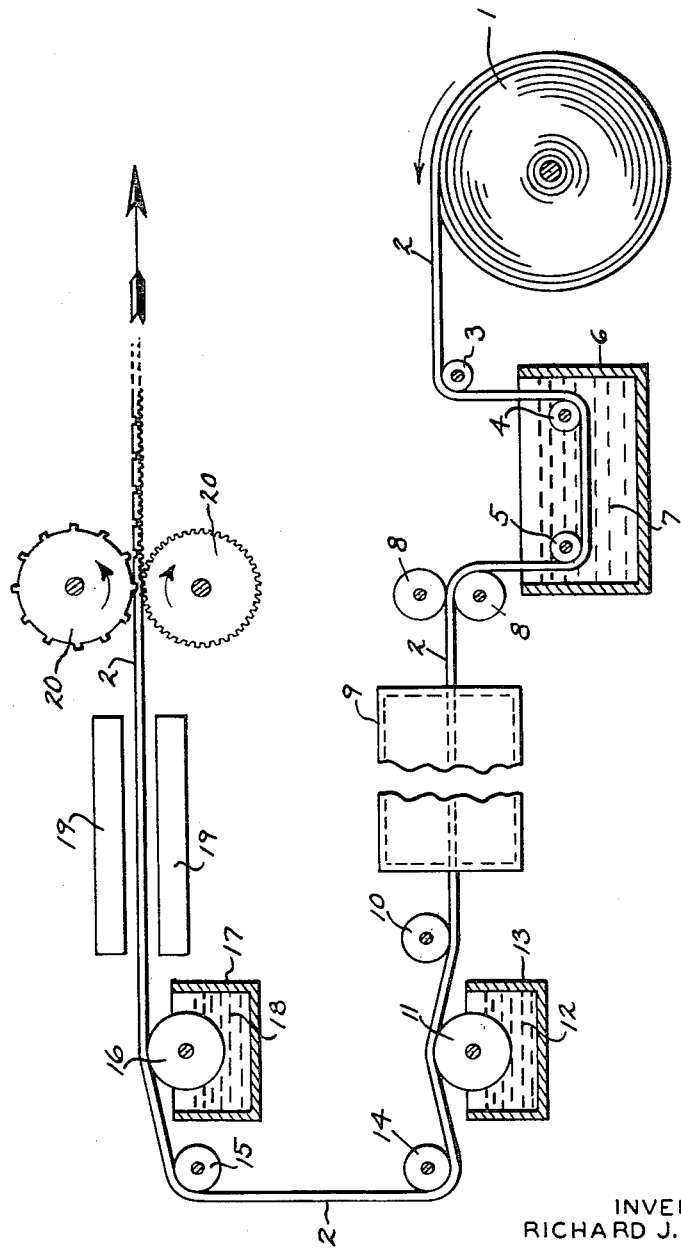
INVENTOR
RICHARD J. WILLIAMS
BY
ATTORNEY

United States Patent Office 3,122,444
Patented Feb. 25, 1964

3,122,444
PROCESS OF TREATING CARPET CUSHIONS
Richard J. Williams, Millington, N.J., assignor to Ozite Corporation, a corporation of Delaware
Filed Dec. 27, 1960, Ser. No. 78,534
6 Claims. (Cl. 117—10)

This invention relates to carpet cushions having a felt base treated on one or both surfaces with a resilient, rubbery material; and it more particularly resides in the use of a treating composition of high solids content that is flash dried to drive off its liquid carrier, the treated surface being embossed after drying to obtain a suitable surface pattern, curing being accomplished after embossing to develop a finished resilient surface layer for the felt base.

Several methods have been devised for applying a resilient surface to felt carpet cushions, and have usually involved the first step of applying a latex suspension of relatively low solids content to a felt base. The liquid carrier of the suspension penetrates the base, while almost all of the solid particles remain on the surface. The coated cushion is then simultaneously dried and embossed using a can-type drier provided with an engraved embossing surface. In some instances, partial drying may comprise a separate step before the final drying and embossing, and in such cases the cushion, which still contains a considerable amount of the carrier, is passed over the engraved can-type drier after the preliminary drying. In either case, the engraved drier must serve the multiple purposes of producing an embossed pattern in the coated surface, completing the drying of the liquid carrier, and curing the coating material to develop a rubber like surface. Since the drier performs all of the foregoing functions, it must be maintained at a relatively high temperature and must remain in contact with the coated cushion for a considerable period of time, thus rendering the manufacture of coated cushions by this method relatively time consuming and uneconomical. Further, since curing is accomplished by the engraved drier, some portions of the finished cushion are subjected to higher temperatures and pressures than others, whereby the resulting coating is not of a uniform cure or density. Still further, the coating remains essentially an independent layer on the top of the felt and is not adequately bonded to the surface fibers whereby the wearing characteristics of the finished product are not wholly satisfactory.

The present invention contemplates a new method of surface treatment that forms an improved rubbery layer and which allows for an increased rate of travel of the felt through the manufacturing apparatus, resulting in faster rates of production. This improved method involves the use of embossing rolls maintained at relatively low pressures for ease of manufacturing, and in addition produces a more uniform product than that previously obtained. Further, there is produced, using relatively less rubber-like solids, a tougher wearing surface which greatly adds to the life of the cushion. The invention contemplates the separation of the drying, curing, and embossing steps, whereby each step may be accomplished so much more effectively that the overall manufacturing time of the cushion is decreased. The effectiveness of the process is enhanced through the use of a comparatively viscous treating composition of relatively high solids content which can be quickly dried and then subsequently cured at room temperatures.

In the preferred method of this invention the felt base, which may have been previously treated with a pigmented impregnating composition and dried, is first treated by the application to one or both surfaces of a natural or synthetic latex emulsion. The treated felt then passes through radiant heating units that serve to flash off the liquid carrier of the emulsion and to trigger final cure. The dried cushion is then immediately passed between embossing rolls which instantaneously impart any desired pattern to the treated surface. Curing however, does not take place to any substantial degree until after the brief embossing step is completed. The cushion may be wound onto rolls after embossing and substantially the entire cure occurs at room temperatures during storage. Thus, curing time is removed as a factor in the manufacturing process itself, and in addition the rubbery surface is cured evenly since no portions are subjected to higher temperatures or pressures than others during curing. Further, the rubber particles of the treating composition and the surface fibers of the felt are bonded together to form an integral surface layer of improved durability.

It is an object of this invention to provide a carpet cushion treated on one or both of its surfaces to form a rubber-like bonded surface layer of uniform density and cure and of improved durability.

It is another object of this invention to provide a process for accomplishing such a surface treatment efficiently, rapidly and economically.

It is a further object of this invention to provide a process in which curing time is not a factor in manufacturing time, and in which the drying and embossing steps are separated from the curing and from one another.

The foregoing and other objects and advantages will become apparent from the description to follow. In the description reference is made to the accompanying drawing which forms a part hereof and in which there is shown by way of illustration and not of limitation a specific embodiment of this invention.

The drawing is a schematic representation, with parts broken away and in section, of an apparatus suitable for practicing this invention.

Referring specifically now to the drawing, there is shown a supply roll 1 which contains a supply of untreated felt 2. The felt 2 may comprise any suitable carpet cushion material adapted to receive the surface treatment described herein such as, for example, needled jute or hair, or a needled combination of hair and jute, or a felted hair, or some other felted material; and the term "felt" as used herein is intended to encompass any material of this nature satisfactory for a carpet cushion.

After being withdrawn from the supply roll 1, the felt 2 is guided by rolls 3, 4 and 5 through a sizing bath 6 containing an impregnating material 7 which includes a suitable resin and a coloring pigment. The resin serves to coat the fibers of the felt 2 to bond the pigment to the ibers and also to impart additional resiliency to the fibers. The resin should not, however, be picked up by the felt 2 n amounts sufficient to cause any appreciable fiber to iber bonding, and consequent loss of porosity, within the elt 2. The dry weight of the resin picked up by a given amount of felt 2 should be in the neighborhood of 5%, and less than 10%, of the dry weight of the felt 2. In order to insure that no more than the proper amount of resin is picked up, the impregnating material 7 should have a resin content of approximately 3% by weight and less than 10% by weight.

In usual impregnating treatments a pigment reacts directly with the felt fibers to impart the desired color to the felt. This reaction may not be uniform, however, due to inconsistencies in the felt, and in the present impregnation the pigment is believed to have a reaction with the resin wherein the resin binds the pigment to the individual felt fibers, thereby rendering a more uniform treatment and coloring of the felt.

For the practice of impregnating in accordance with the foregoing considerations, a material comprising a urea formaldehyde thermosetting resin emulsified with a pigmented constituent can be applied using a water carrier. A suitable gum may also be added as well as wetting and dispersing agents. Such a material will satisfactorily saturate the felt 2 when immersed in the bath 6.

After being impregnated, the felt 2 passes through squeeze rolls 8 which serve to remove excess liquid and thereby partially dry the felt 2. The partially dried felt 2 is then passed through a conventional dryer 9 wherein the impregnated felt 2 is completely dried with the heat of the dryer 9 serving to set the resin in the impregnating composition 7. Although impregnating and drying in the foregoing manner produces an attractive base of improved resiliency, the surface treatment to be hereinafter described may, however, be applied either to a felt base which has been dyed or impregnated in some different manner or which has remained untreated. Since the treatment of the invention may be practiced independently of any preliminary impregnation or coloring, the claims appended hereto are not necessarily restricted to any such preliminary processing of the felt 2.

Whether or not the felt 2 has been impregnated and dried, it is guided by a roll 10 across an applicating roll 11 which is partially immersed in a liquid treating composition 12 retained in a fountain 13. The roll 11 serves to pick up a quantity of the composition 12 and apply it to the underside of the felt 2, as seen in the drawing. The felt 2 then passes about idler rolls 14 and 15 and across a second applicating roll 16 partially immersed in a fountain 17 which serves to apply a treating composition 18, which is essentially the same as composition 17, to the opposite side of the felt 2. Alternatively, the treating composition may be applied by any other suitable means.

The treating composition is essentially a rubber latex of high solids content and contains various fillers, accelerators, curing agents and the like as may be desired for the particular formulation. The latex may be a natural or a synthetic rubber and it is desirable to employ a water emulsified latex that can be rapidly dried to achieve the final cure after a drying step as discussed hereinafter. For the latex, a satisfactory synthetic is exemplified by a styrene butadiene copolymer, which, like neoprene, is quite similar to the natural rubbers. Other latex binders suitably dispersed in a liquid carrier may also be employed, the general purpose being to select a material that will form a rubbery layer with the surface of the felt and that has manufacturing characteristics as herein discussed.

A typical formulation for the treating composition is set forth below and comprises two independently mixed parts, I and II, which are mixed together shortly before use.

| Ingredient | Description and Function | Usage on a Parts Basis |
|---|---|---|
| Part I: | | |
| 2105 Latex (63.4% T.S.) | Styrene-butadiene Copolymer (Latex Binder). | 100 dry. |
| Darvan #7 (35% T.S.) | Polyelectrolyte (Dispersing Agent and Stabilizer). | 0.75 dry. |
| Zinc Oxide Disp. (50% T.S.). | (Activator of Cure) | 3.0 dry. |
| Dispersed Sulphur (68% T.S.). | (Curing Agent) | 0.30 dry. |
| Agerite Stalite Emul. (45% T.S.). | Octylated Diphenylamine (Antioxidant). | 1.0 dry. |
| Setsit-9 | Activated Dithiocarbamate (Accelerator). | 1.0 wet. |
| Butyl Zimate Disp. (50% T.S.). | Zinc Dibutyldithiocarbamate (Accelerator). | 1.0 dry. |
| Zetax Disp. (50% T.S.) | Zinc salt of 2-mercapto-benzothiazole (Accelerator). | 1.0 dry. |
| Part II: | | |
| MacNamee Clay | Soft Clay (Mineral Filler) | 50 dry. |
| Darvan #7 (35% T.S.) | Polyelectrolyte (Dispersing Agent and Stabilizer). | 0.30 dry. |
| Tetrasodium pyrophosphate. | (Diflocculant) | 0.30 dry. |
| Dispersed Sulphur (68% T.S.). | (Curing Agent) | 1.7 dry. |
| Aerosol OT (75% T.S.) | Sodium Salt of the Dioctyl Ester of Sulfo Succinic Acid (Wetting Agent and Stabilizer). | 0.25 dry. |
| Water Dispersed Pigments (40% T.S.).[1] | (Coloring Agent) | 4.25 dry.[1] |
| Acrysol G5 | Polyacrylate (Thickening Agent). | 1.25 dry.[2] |

[1] Approximately, depending on color required.
[2] Approximately, depending on mode of coating application.

A water carrier is employed in the above formulation to obtain an emulsified latex, and the total solids content for each ingredient is set forth parenthetically in the first column of the table. Part I of the composition contains the synthetic latex together with a relatively small amount of sulphur which serves as a vulcanizing or curing agent. After the ingredients of part I have been mixed, the mixture is allowed to stand for a time, and the sulphur will cause a partial precure by causing some cross linking of the long chain rubber molecules. Although it is difficult to determine the exact degree of precure, it can be estimated that curing will proceed to approximately 25 percent of completion by virtue of the sulphur contained in part I, and will proceed no further until the addition of part II. Thus, part I can be stored for a considerable period before use.

Similarly, part II, which contains the bulk of the sulphur needed for full curing together with other ingredients, may be prepared and stored prior to use. Parts I and II are then mixed to form the emulsified treating composition to be applied to the felt 2. Although full curing does not occur immediately after mixture since the heat of drying is required to trigger the final cure of the above formulation, the composition should be used within about a day's time after parts I and II have been combined.

The particular composition described herein has a total solids concentration of approximately 60% by weight, which contrasts sharply with the 15% solids concentration sometimes found in coating compositions previously employed. Although a variety of compositions could be used without departure from the invention, it is important that the particular composition used have a relatively high solids concentration, of at least 50% by weight, in order to obtain a rapid drying as hereinafter described. In order to allow for proper processing characteristics, the solids concentration should fall within the range of 50–75% by weight. A higher solids content, even approaching 100%, is however, within the purview of this invention in those instances where handling problems do not exist.

In order to insure that the composition remains distinctly in the very top surface layer of the felt 2, it should be of relatively high viscosity. Depending on the particular formulation used, it may be necessary to add appropriate thickeners for this purpose. The particular treating treating composition described herein has a viscosity of approximately 2700 centipoises. In order to obtain the best results, the composition should have a viscosity of at least 1500 centipoises.

After the felt 2 has been treated on both sides, or only one one side if desired, it is passed between radiant heating units 19 which may be in the form of quartz lamps operating with a filament temperature of approximately 4080° F. The heat emitted by the units 19 is almost entirely radiant, and this results in less heating of the surrounding air than found with older methods, thereby reducing the temperature in the manufacturing area. Due to the extreme heat, the liquid carrier of the treating composition may be driven off, or flash dried, in a period of approximately 10 seconds; and the treated surface, by exposure to the units 19, is heated to a temperature of approximately 212° to 250° F. This heating, in addition to driving off the liquid carrier, serves to trigger the full curing of the treating composition. That is, the heat does not in itself cause the composition to cure, but merely affords an environment in which the remaining sulphur begins to vulcanize or cross link the long chain rubber molecules.

Immediately after being heated and dried, the felt 2 passes between a pair of embossing rolls 20 which impart any suitable pattern to the treated surfaces. Embossing also serves to bind together the treating composition and the topmost surface layer of felt fibers thus creating a resilient surface integral with the felt 2 rather than the semi-independent rubber layer produced by older methods. The felt 2 completes its passage through the embossing rolls 20 within approximately one second after exposure to the heating units 17. Thus, the final curing which has been triggered by the units 19 does not proceed to any substantial degree until after the felt 2 has been fully embossed. The embossing rolls 20 are preferably maintained at a temperature in the neighborhood of 300° F. and the felt 2, after embossing, has been heated to a temperature between 250° F. and 300° F.

After embossing, the felt 2 may be placed on storage rolls, not shown, which may be removed from the manufacturing area and kept in any suitable storage space. It is during storage that substantially all of the final curing takes place. Although the time required for final curing will depend to a certain extent on the temperature of the felt 2 when stored and upon the temperature at which the stored roll stabilizes, curing will generally be completed within 5 days.

In essence, then, the time required for actual manufacturing processes after the felt 2 has been treated can be reduced by the method of this invention to a period of approximately 11 seconds. Although curing continues for some time thereafter, it is accomplished during the storage which would be necessary in any case and does not interfere with or delay the actual manufacturing process. Further, curing takes place without unequal pressure and the finished surface is of uniform characteristics in both the indented and unindented areas of the embossed pattern. Still further, the equipment necessary for manufacture, and especially the embossing rolls, can be substantially lighter and can be operated at lower pressures than apparatus heretofore employed.

It is a particular discovery of the invention that rapid flash drying can be achieved through high temperature radiant heating to complete drying, for all practical purposes, before any embossing is undertaken and independently of the cure. The dried surface can then be embossed before any substantial cure takes place and, as a consequence, the events of drying, embossing and curing are separated into individual steps.

It will be apparent that a number of changes could be made in the specific manufacturing process shown and described herein without departure from the invention. For example, various heating units could be substituted for the units 19, various driving and applicating mechanisms could be incorporated, and other treating compositions could be used. Thus, the invention herein is not intended to be limited except insofar as such limitations appear in the following claims.

I claim:

1. In the manufacture of a carpet cushion having a felt base with a resilient, treated surface, the method comprising: applying to at least one surface of the felt base a latex treating composition having a volatile carrier and a total solids content of at least 50% by weight, said treating composition including a curing agent together with a rubber selected from the group consisting of natural rubbers and synthetic rubber, said treating composition remaining distinctly in the topmost surface layer of the felt base; flash drying the treated surface to drive off the volatile carrier and to trigger the cure of the treating composition; then immediately embossing the treated surface to create raised and indented areas therein, said embossing being completed prior to substantial curing of the treating composition; and then curing the treating composition.

2. In the manufacture of a carpet cushion having a felt base with a resilient, treated surface, the method comprising: impregnating the felt base with a liquid impregnating material containing pigment and less than 10% by weight of resin; heating the impregnated felt base to dry the same, said resin serving to bind the pigment to the fibers of the felt base without substantial fiber to fiber bonding; then applying to at least one surface of the impregnated felt base a latex treating composition having a volatile carrier and a total solids content of at least 50% by weight, said treating composition including a curing agent together with a rubber selected from the group consisting of natural rubbers and synthetic rubber, said treating composition remaining distinctly in the topmost surface layer of the felt base; flash drying the treated surface by means of radiant heat to drive off the volatile carrier and to trigger the cure of the treating composition; then immediately embossing the treated surface to create raised and indented areas therein, said embossing being completed prior to substantial curing of the treating composition; and then curing the treating composition.

3. In the manufacture of a carpet cushion having a felt base with a resilient, treated surface, the method comprising: applying to at least one surface of the felt base a treating composition having a total solids content of at least 50% by weight and containing latex including a rubber selected from the group consisting of natural rubbers and synthetic rubbers, which rubber has been partially cured, a volatile carrier and a curing agent adapted to cause the latex to be triggered toward full cure upon the application of heat; heating the treated surface to dry off the volatile carrier and to trigger the movement of the latex to full cure; then immediately embossing the treated surface before the full cure of the latex has taken place in a substantial degree; and then allowing the latex to proceed to full cure.

4. In the manufacture of a carpet cushion having a felt base with a resilient, treated surface, the method comprising: applying to at least one surface of the felt base a treating composition which includes a latex having a volatile carrier, the total solids content of the treating composition being at least 50% by weight, said treating composition including a curing agent together with a rubber selected from the group consisting of natural rubbers and synthetic rubbers, said treating composition being adapted to remain distinctly in the topmost surface layer of said base and to be triggered toward cure by the application of heat; applying radiant heat at a source temperature of approximately 4080° F. to the treated surface to drive off the volatile carrier and trigger final cure of the treating composition; then immediately embossing the treated surface to create raised and indented areas therein, embossing being completed before the treating composition has proeeded toward final cure to a substantial degree; and then curing the treating composition.

5. In the manufacture of a carpet cushion having a felt base with a resilient, treated surface, the method comprising: impregnating the felt base with a liquid impregnating material containing pigment and approximately 3% by weight of a thermosetting resin in a volatile carrier; heating the impregnated felt base to drive off the volatile carrier of the impregnating material and to cause the resin to bind the pigment to the fibers of the felt base without causing substantial fiber to fiber bonding therein; then applying to at least one surface of the impregnated felt base a latex treating composition of sufficient viscosity to remain distinctly in the topmost surface layer thereof, said treating composition including a volatile carrier and having a total solids concentration in the range of 50–75% by weight and being adapted to be triggered to cure upon the application of heat, said treating composition including a curing agent together with a rubber selected from the group consisting of natural rubbers and synthetic rubber; then heating the treated surface to drive off the volatile carrier of the treating composition and to trigger the cure thereof; then immediately embossing the treated surface to produce raised and indented areas therein, embossing being completed before the treating composition has cured to a substantial degree; and then curing the treating composition.

6. In the manufacture of a carpet cushion having a felt base with a resilient, treated surface, the method comprising: applying to at least one surface of the felt base a treating composition containing a partially precured rubber selected from the group consisting of natural rubbers and synthetic rubbers, a volatile carrier and a curing agent, said treating composition having a total solids content within the range of 50–75% by weight and being of sufficient viscosity to remain distinctly in the topmost surface layer of the felt base and being compounded to be triggered toward final cure by the application of heat and being compounded to proceed to full cure at room temperatures; applying radiant heat at a source temperature of approximately 4080° F. to the treated surface for a period of approximately 10 seconds to drive off substantially all the volatile carrier and trigger final cure of the treating composition; then embossing the treated surface with embossing means maintained at a temperature of approximately 300° F., embossing being completed within approximately 1 second after application of the radiant heat and before the final cure of the treating composition has proceeded to a substantial degree; and then storing the treated base at room temperatures to allow the treating composition to proceed to final cure.

References Cited in the file of this patent

UNITED STATES PATENTS

| | | |
|---|---|---|
| 2,585,108 | Gordon | Feb. 12, 1952 |
| 2,585,109 | Gordon | Feb. 12, 1952 |
| 2,593,207 | Silver | Apr. 15, 1952 |
| 2,838,416 | Babiarz et al. | June 10, 1958 |
| 2,957,780 | Stephens et al. | Oct. 25, 1960 |
| 2,971,857 | Baxter | Feb. 14, 1961 |

UNITED STATES PATENT OFFICE
CERTIFICATE OF CORRECTION

Patent No. 3,122,444        February 25, 1964

Richard J. Williams

It is hereby certified that error appears in the above numbered patent requiring correction and that the said Letters Patent should read as corrected below.

Column 2, line 26, for "rubber" read -- rubbery --; column 5, line 7, for "one", first occurrence, read -- on --; column 6, line 7, through column 8, line 21, strike out all the present claims, and insert instead:

1. In the manufacture of a carpet cushion having a porous felt base with a resilient, treated surface, the method comprising: applying to at least one surface of the felt base a rubber latex treating composition having a volatile carrier and a total solids content of at least 50% by weight, said treating composition including a curing agent together with a rubber selected from the group consisting of natural rubbers and synthetic rubbers said treating composition remaining distinctly in the topmost surface layer of fibers of the felt base; flash drying the treated surface by radiant heating to drive off substantially all the volatile carrier and to trigger the cure of the deposited rubber of the treating composition; then immediately embossing the treated surface to create raised and indented areas therein with the rubber being bound together with the fibers of the topmost surface layer of the felt, said embossing being completed prior to substantial curing of the deposited rubber; and then curing the deposited rubber, such curing having been triggered prior to embossing.

2. In the manufacture of a carpet cushion having a porous felt base with a resilient, treated surface, the method comprising: impregnating the felt base with a liquid impregnating material containing pigment and less than 10% by weight of resin; heating the impregnated felt base to dry the same, said resin serving to bind the pigment to the fibers of the felt base without substantial fiber to fiber bonding; then applying to at least one surface of the impregnated felt base a rubber latex treating composition having a volatile carrier and a total solids content of at least 50% by weight, said treating composition including a curing agent together with a rubber selected from the group consisting of natural rubbers and synthetic rubbers said treating composition remaining distinctly in the fibers of the topmost surface layer of the felt base; flash drying the treated surface by means of radiant heat to drive off substantially all the volatile carrier and to trigger the cure of the deposited rubber of the treating composition; then immediately embossing the treated surface to create raised and indented areas therein with the rubber being bound together with the fibers of the topmost surface layer of the felt, said embossing being completed prior to substantial curing of the deposited rubber; and then curing the deposited rubber, such curing having been triggered prior to embossing.

3. In the manufacture of a carpet cushion having a porous felt base with a resilient, treated surface, the method comprising: applying to at least one surface of the felt base a rubber latex treating composition having a total solids content of at least 50% by weight and containing latex including a rubber selected from the group consisting of natural rubbers and synthetic rubbers, which rubber has been partially cured, a volatile carrier and a curing agent adapted to cause the rubber to be triggered toward full cure upon the application of heat; heating the treated surface with radiant heat to dry off substantially all the volatile carrier and to trigger the movement of the rubber to full cure; then immediately embossing the treated surface before the full cure of the rubber has taken place to any substantial degree; and then allowing the rubber to proceed to full cure.

4. In the manufacture of a carpet cushion having a porous felt base with a resilient, treated surface, the method comprising: applying to at least one surface of the felt base a treating composition which includes a rubber latex having a volatile carrier, the total solids content of the treating composition being at least 50% by weight said treating composition including a curing agent together with a rubber selected from the group consisting of natural rubbers and synthetic rubbers, said treating composition remaining distinctly in the topmost surface layer of fibers of said base and adapted to be triggered toward cure by the application of heat; applying radiant heat at a source temperature of approximately 4080° F. to the treated surface for a period of about ten seconds to drive off substantially all the volatile carrier and to trigger final cure of the deposited rubber of the treating composition; then immediately embossing the treated surface to create raised and indented areas therein with the deposited rubber of the treating composition being bound together with the fibers of the topmost surface layer of the felt, embossing being completed before the deposited rubber has proceeded toward final cure to any substantial degree; and then curing the deposited rubber.

5. In the manufacture of a carpet cushion having a porous felt base with a resilient, treated surface, the method comprising: impregnating the felt base with a liquid impregnating material containing pigment and approximately 3% by weight of a thermosetting resin in a volatile carrier; heating the impregnated felt base to drive off the volatile carrier of the impregnating material and to cause the resin to bind the pigment to the fibers of the felt base without causing substantial fiber to fiber bonding therein; then applying to at least one surface of the impregnated felt base a rubber latex treating composition of sufficient viscosity to remain distinctly in the topmost surface layer thereof, said treating composition including a volatile carrier and having a total solids concentration in the range of 50-75% by weight and being adapted to be triggered to cure upon the application of heat said treating composition including a curing agent together with a rubber selected from the group consisting of natural rubbers and synthetic rubbers; then applying radiant heat to the treated surface to immediatel drive off substantially all the volatile carrier of the treating composition and to trigger the cure of the deposited rubber; then immediately embossing the treated surface to produce raised and indented areas therein with the deposited rubber being bound together with the fibers of the topmost surface layer of the felt, embossing being completed before the rubber has cured to a substantial degree; and then curing the rubber.

6. In the manufacture of a carpet cushion having a porous felt base with a resilient, treated surface, the method comprising: applying to at least one surface of the felt base a treating composition containing a latex including a partially precured rubber selected from the group consisting of natural rubbers and synthetic rubbers, a volatile carrier and a curing agent, said treating composition having a total solids content within the range of 50-75% by weight and being of sufficient viscosity to remain distinctly in the topmost surface layer of the felt base and being compounded to be triggered toward final cure by the application of heat and being compounded to proceed to full cure at room temperatures; applying radiant heat at a source temperature of approximately 4080° F. to the treated surface for a period of approximately 10 seconds to drive off substantially all the volatile carrier and trigger final cure of the deposited rubber of the treating composition; then embossing the treated surface with embossing means maintained at a temperature of approximately 300° F., embossing being completed within approximately 1 second after application of the radiant heat and before the final cure of the deposited rubber has proceeded to any substantial degree; and then storing the treated base at room temperatures to allow the deposited rubber to proceed to final cure.

Signed and sealed this 7th day of July 1964.

(SEAL)
Attest:

ERNEST W. SWIDER

Attesting Officer

EDWARD J. BRENNER

Commissioner of Patents